(12) United States Patent
Ochi et al.

(10) Patent No.: US 7,830,755 B2
(45) Date of Patent: Nov. 9, 2010

(54) OPTICAL HEAD AND OPTICAL DISC DRIVE

(75) Inventors: Manabu Ochi, Fujisawa (JP); Fumihito Ichikawa, Yokohama (JP); Hiroyasu Yoshida, Yokohama (JP); Mitsuo Satake, Yokohama (JP)

(73) Assignee: Hitachi Media Electronics Co., Ltd., Iwate-Ken (JP)

( * ) Notice: Subject to any disclaimer, the term of this patent is extended or adjusted under 35 U.S.C. 154(b) by 641 days.

(21) Appl. No.: 11/668,086

(22) Filed: Jan. 29, 2007

(65) Prior Publication Data

US 2008/0080358 A1   Apr. 3, 2008

(30) Foreign Application Priority Data

Jun. 2, 2006 (JP) .............................. 2006-154147

(51) Int. Cl.
G11B 7/00 (2006.01)
(52) U.S. Cl. .................................................. 369/44.14
(58) Field of Classification Search .............. 369/44.11, 369/44.13, 44.14, 44.15, 44.21, 120, 121, 369/116, 44.16
See application file for complete search history.

(56) References Cited

U.S. PATENT DOCUMENTS 7,428,192 B2 * 9/2008 Ochi et al. ............... 369/44.14

7,564,745 B2 * 7/2009 Kanaya et al. ........... 369/44.14

FOREIGN PATENT DOCUMENTS

| JP | 2003-123297 | 4/2003 |
|----|-------------|--------|
| JP | 2004-047106 | 2/2004 |
| JP | 2004-145921 | 5/2004 |
| JP | 2005-166218 | 6/2005 |

* cited by examiner

*Primary Examiner*—Nabil Z Hindi
(74) *Attorney, Agent, or Firm*—Antonelli, Terry, Stout & Kraus, LLP.

(57) ABSTRACT

The present invention provides an optical head for realizing the stable operation by controlling the temperature of the semiconductor laser to a low level by reducing the heat transfer rate from a laser driver IC to a housing in the vicinity of a semiconductor laser, and an optical disc drive using the same. It provides an optical head having a semiconductor laser and a photo detector arranged on one side with respect to a straight line through the center of an object lens of an object lens actuator and in parallel to the axis contacted with bearings, and a laser driver IC arranged on the other side with respect to the straight line. Thereby, the distance from the laser driver IC to the semiconductor laser can sufficiently be ensured so that the heat transfer rate from the laser driver IC to the housing can be reduced.

5 Claims, 7 Drawing Sheets

A-A CROSS-SECTION

A-A CROSS-SECTION

A-A CROSS-SECTION

A-A CROSS-SECTION

B-B CROSS-SECTION

OPTICAL HEAD AND OPTICAL DISC DRIVE

BACKGROUND OF THE INVENTION

1. Field of the Invention

The present invention relates to an optical head for reading the information written on a recording surface of a disc or writing information on a recording surface of a disc, and an optical disc drive using the same such as a CD/DVD device.

2. Description of the Related Art

An example of the conventional structure of an optical head is disclosed in the official gazette of the Japanese Patent Application Laid-Open No. 2003-123297. According to the configuration of the optical head disclosed in JP-A No. 2003-123297, a laser driver (hereinafter, it is referred to as a laser driver IC) is arranged between a carriage and a holding sheet metal provided on the lowermost surface of the carriage (hereinafter it is referred to as a housing) in the vicinity of a semiconductor laser.

In the case the laser driver IC is arranged in the vicinity of the semiconductor laser, the heat generated in the laser driver IC is conducted to the housing in the vicinity of the semiconductor laser to raise the temperature of the housing. In the case the temperature of the housing rises, the temperature of the semiconductor laser rises as well, and consequently the performance and the life of the semiconductor laser are affected, and thus it is problematic.

SUMMARY OF THE INVENTION

Accordingly, an object of the present invention is to provide an optical head for realizing the stable operation by controlling the temperature of the semiconductor laser to a low level by reducing the heat transfer rate from a laser driver IC to a housing in the vicinity of a semiconductor laser without influencing the optical characteristics, and an optical disc drive using the same.

In order to achieve the above-mentioned object, the present invention provides the following configurations.

It provides an optical head having a semiconductor laser and a photo detector arranged on one side with respect to a straight line through the center of an object lens of an object lens actuator and in parallel to the axis contacted with bearings, and having a laser driver IC arranged on the other side with respect to the straight line.

According to the present invention, the distance from the laser driver IC to the semiconductor laser can sufficiently be ensured so that the heat transfer rate from the laser driver IC to the housing can be reduced. Thereby, since the temperature of the semiconductor laser can be controlled to a low level, the life deterioration or the operation error of the semiconductor laser can be prevented so that the reliability of the optical head and the optical disc drive using the same can be improved. Moreover, also in an optical head on which a plurality of semiconductor lasers are mounted as light source, it is advantageous that the laser driver IC can be isolated from all the semiconductor lasers. That is, the same effect as mentioned above can be obtained for all the semiconductor lasers.

DESCRIPTION OF THE PREFERRED EMBODIMENTS

Figure 5:
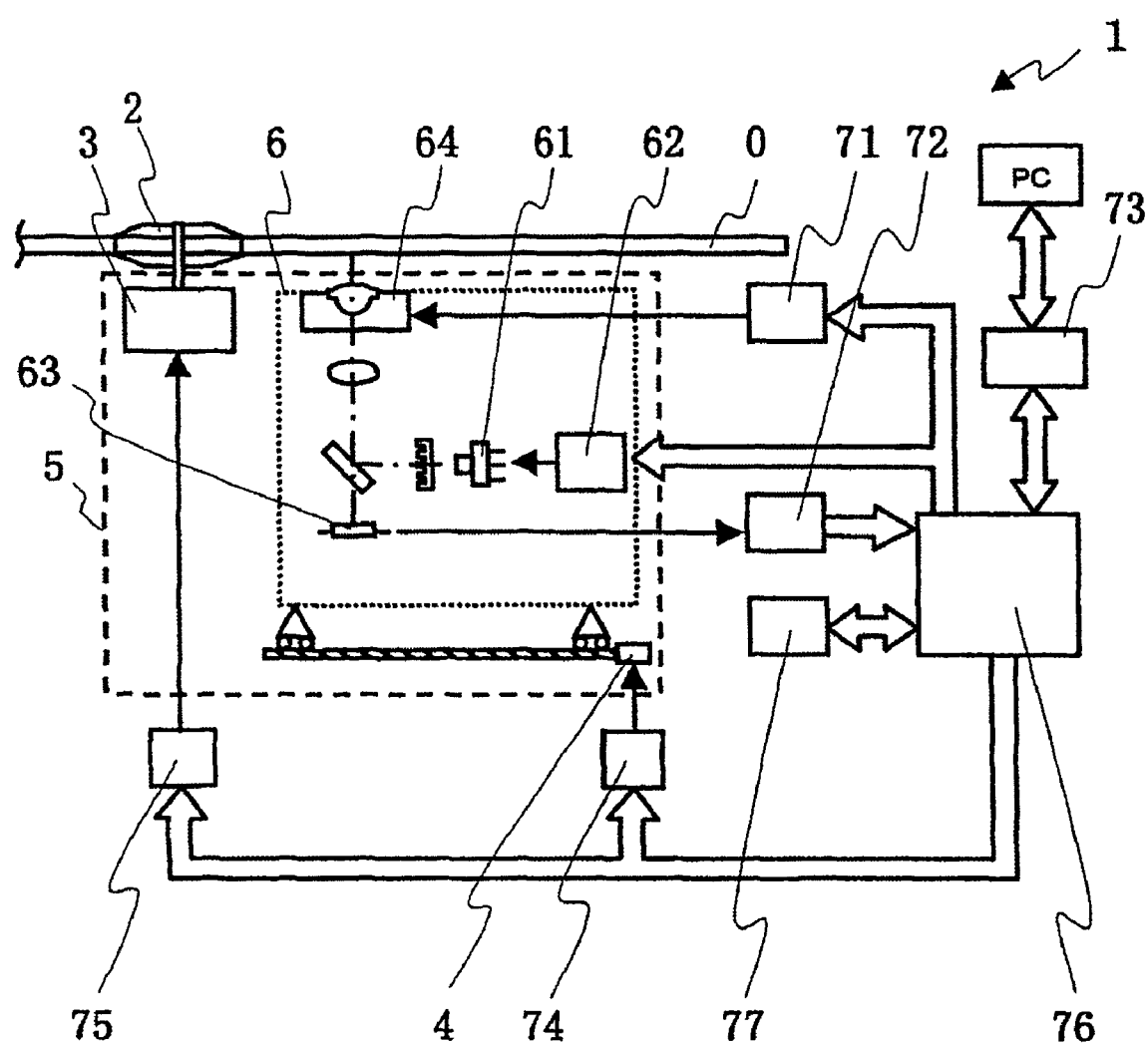
FIG. 5 is a block diagram of an optical disc drive according to the present invention.

First, the configuration of an optical disc drive 1 on which an optical head 6 of this embodiment is mounted will be explained. FIG. 5 is a block diagram of the optical disc drive 1. The optical disc drive 1 comprising a mechanical unit 5 and a servo circuit communicates with a PC via an interface 73. The mechanical unit 5 comprising a spindle motor 3, the optical head 6, a feed motor 4, mechanical chassis and a metal cover 8, is a mechanism for precisely maintaining the distance and the angle between the optical head 6 and a disc 0. A servo circuit mainly comprising a CPU 77 and a signal processor 76 controls each part based on a signal outputted form a photo detector 63 or a spindle motor driver circuit 75.

First, the constituent parts of the mechanical unit 5 will be explained. The spindle motor 3 is a motor for rotating the disc 0, and it is provided with a turntable 2 for placing the disc 0 with the axial-runout and the radial-runout reduced. The optical head 6 is a device for reading the information from the disc 0 without contact, or writing the information on the disc 0 without contact, and it mainly comprises an optical system, an object lens actuator 64, and a flexible printed circuit 65. Details of the optical head 6 will be described later. A feed motor 4 is a motor for moving the optical head 6 to a predetermined position in the radial direction of the disc 0 along a reference axis. The mechanical chassis for holding the above-mentioned parts is mounted on the main body of the optical disc drive 1 via an insulator comprising an elastic member. The metal cover 8 is disposed between the disc 0 and the optical head 6, as an electromagnetic shield and as a holder for the flexible printed circuit 65. An opening part 81 is provided in the central part thereof.

Next, the servo circuit will be explained. An object lens driver IC 71 is a circuit for controlling the electric current to be outputted to the object lens actuator 64 for always focusing a laser beam on a track of the disc 0. A feed motor driver circuit 74 is a servo circuit for moving the optical head 6 to a purposed position at the time of accessing in the radial direction of the disc 0 beyond the tracking moving range of the object lens actuator 64. A spindle motor driver circuit 75 is a circuit for controlling the rotational frequency of the spindle motor 3 such that the waveform of a reproduction signal can be provided in a desired frequency range. A laser driver IC 62 is a circuit for controlling the light amount of a laser beam emitted from a semiconductor laser 61 highly accurately for providing a reproduction signal at a constant size or improving the recording quality to the disc 0.

An embodiment of the present invention is such an optical head 6 and an optical disc drive 1 using the same that the temperature rise amount of the semiconductor laser 61 is reduced by arranging the semiconductor laser 61 and the photo detector 63 on one side with respect to a straight line through the center of the object lens 647 of the object lens actuator 64 and in parallel to the axis contacted with bearings 69, and by arranging the laser driver IC 62 on the other side with respect to the straight line, for preventing the life deterioration or the operation error of the semiconductor laser 61 accompanied by heat generation of the laser driver IC 62. Hereinafter, the embodiment of the present invention will be explained with reference to FIGS. 1 to 4,6, and 7.

Figure 1:
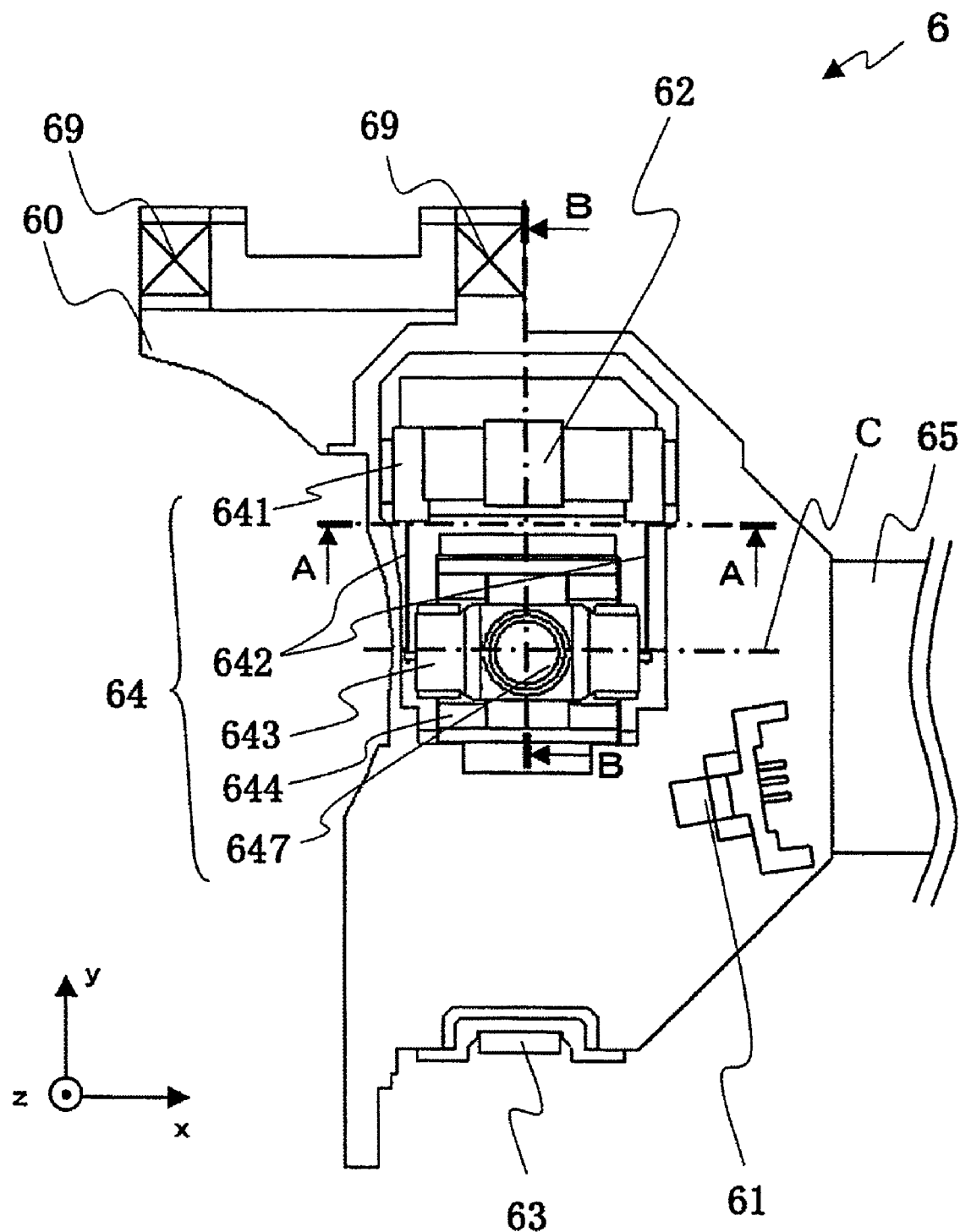
FIG. 1 is a top view schematically showing an optical head according to the present invention.

FIG. 1 is a top view showing the simplified arrangement of the principal parts of the optical head 6 of an embodiment of the present invention. In the figure, the x axis direction denotes the tracking direction that is the radial direction of the disc, the y axis direction denotes the tangential direction of the unshown disc, and the z axis direction denotes the focusing direction that is the optical axis direction of the object lens 647. Moreover, in the figure, the direction approaching to the unshown disc with respect to the object lens 647 is defined to "above", and the direction moving away from there is defined to "below".

As mentioned above, the optical head 6 comprises mainly the optical system and the object lens actuator 64, and the flexible printed circuit 65. The optical system comprises the semiconductor laser 61, a lens and a mirror for focusing the laser beam onto the recording surface of the disc 0 or the label surface, and the photo detector 63 for converting the change of a reflected beam from the disc 0 into electrical signals. The object lens actuator 64 is a mechanism for controlling the position of the object lens 647 to accurately read or write the information by focusing on a track of the disc. Specifically, it comprises a magnetic circuit 644 having a yoke and a magnet, a holding means 643 provided with a coil and the object lens 647, a fixed part 641 for holding the holding means 643, and cantilever beam supporting members 642 for elastically supporting the holding means 643 with respect to the fixed part 641. The flexible printed circuit 65 is a substrate for electrically connecting the object lens actuator 64 and the optical system to the servo circuit, and is connected with the laser driver IC 62 for adjusting the output of the semiconductor laser 61, and the like. These parts are fixed and clamped to the housing 60. The housing 60 is formed with die casting made of an aluminum alloy, a zinc alloy, a magnesium alloy, or the like used as material, or plastic using a polyphenylene sulfide as base material. Moreover, the housing 60 is provided with bearings 69 of the above-mentioned axis for allowing the move of the optical head 6 in the x direction.

Among the parts mounted on the above-mentioned optical head 6, as a heat source at the time of writing or reading, a coil mounted on the object lens actuator 64, the semiconductor laser 61, the laser driver IC 62, the photo detector 63, and the like can be presented. In particular, heat generation of the laser driver IC 62 is particularly significant. At the time, the temperature rise amount of the semiconductor laser 61 includes one derived from the heat generation of the semiconductor laser 61 itself, and one derived from the heat generation of elements other than the semiconductor laser 61, such as the laser driver IC 62. Therefore, for reducing the temperature rise amount of the semiconductor laser 61, it is necessary to improve the light emission efficiency and the cooling efficiency of the semiconductor laser 61, or to alleviate the influence of the heat sources other than the semiconductor laser 61, in particular, the laser driver IC 62.

For explaining the arrangement of the laser driver IC 62, first, the straight line C is defined. The straight line C is a line through the center of the object lens 647 and in parallel to the unshown axis contacted with the bearings 69, and it is shown by a dashed-dotted line in FIG. 1.

Figure 7:
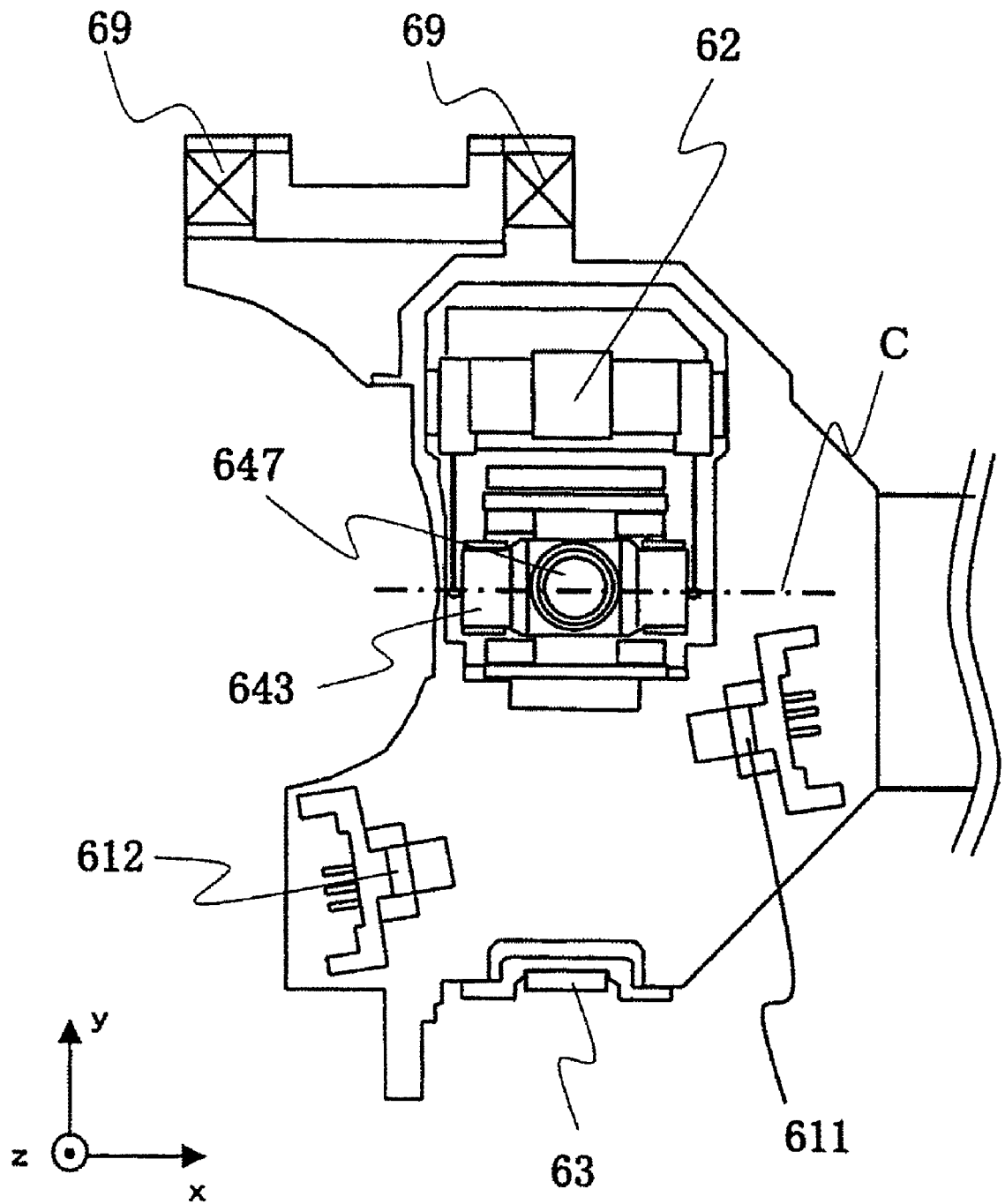
FIG. 7 is a top view schematically showing an optical head according to the present invention.

In this embodiment, the semiconductor laser 61 and the photo detector 63 are arranged on one side with respect to the straight C, and the laser driver IC 62 is arranged on the other side with respect to the straight line C. Accordingly, since the distance between the semiconductor laser 61 and the laser driver IC 62 is widened, the heat transfer rate in the direction from the laser driver IC 62 to the housing 60 in the vicinity of the semiconductor laser 61 can be reduced. Therefore, the temperature rise amount of the semiconductor laser 61 can be reduced so that the temperature of the semiconductor laser 61 can be controlled to a low level. Moreover, according to the positional relationship, even in the case of an optical head with a plurality of the semiconductor lasers 611, 612 as shown in FIG. 7, the both semiconductor lasers 611, 612 and the laser driver IC 62 can be isolated. Therefore, since the temperature rise amount of the both semiconductor laser 611 and semiconductor laser 612 can be reduced, the temperature of the both semiconductor laser 611 and semiconductor laser 612 can be controlled to a low level.

Figure 6:
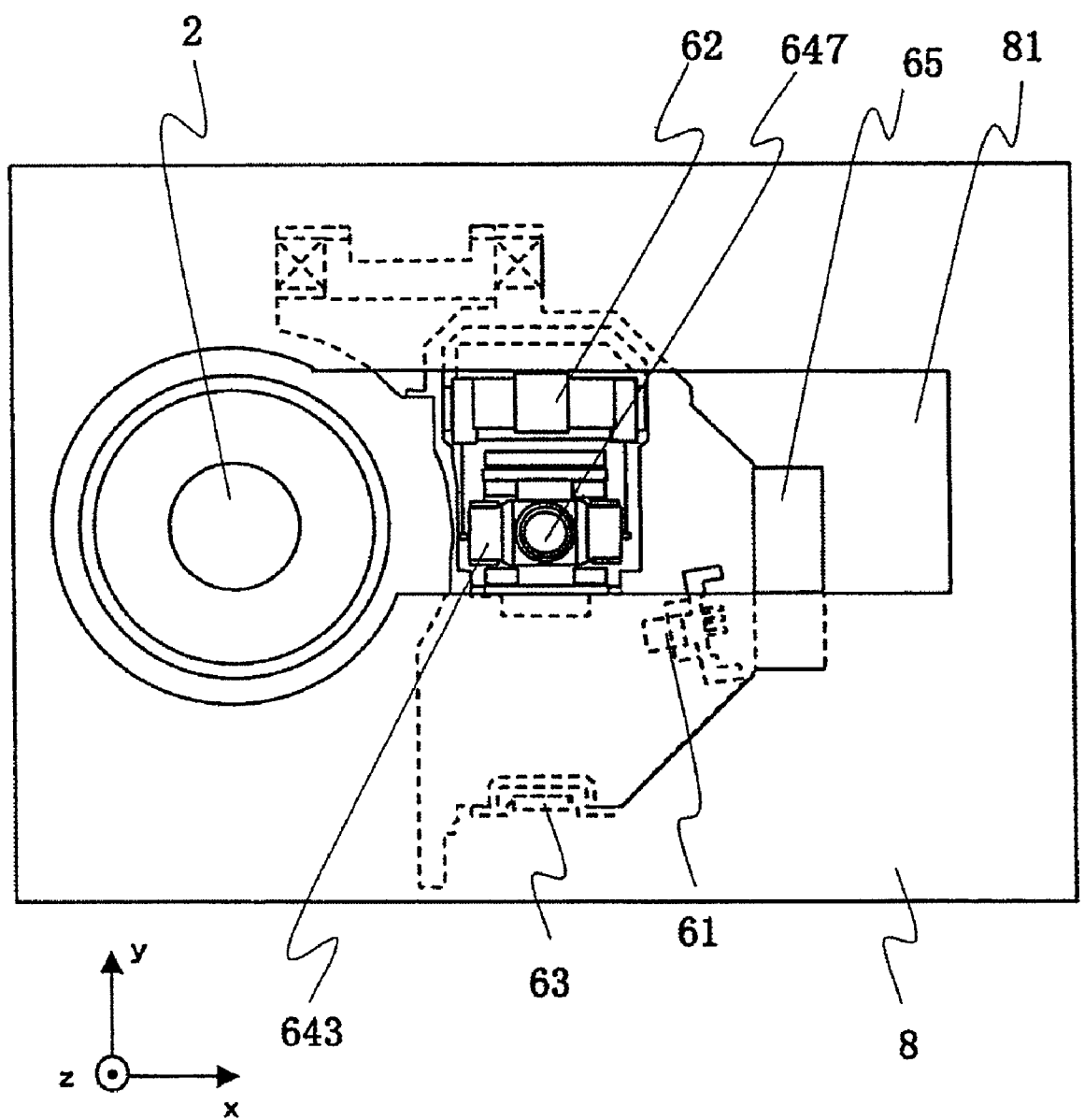
FIG. 6 is a top view of the vicinity of an optical head of a mechanical unit, showing the position of an opening part of a metal cover in the optical disc drive according to the present invention.

FIG. 6 is a top view showing the simplified periphery of the optical head 6 mounted on the mechanical unit 5 in the optical disc drive 1 to show the position of the opening part 81 of the metal cover 8 according to the embodiment of the present invention. In this embodiment, the metal cover 8 is provided with an opening part between the disc and the object lens 647, and between the disc and the laser driver IC 62. Thereby, since the disc and the optical head 6 face directly each other, the wind generated by the disc rotation can directly impact, the coefficient of heat transfer can be improved in the position where the laser driver IC 62 is arranged. As a result, the heat transfer rate from the laser driver IC 62 to the housing 60 can dramatically be reduced. Thereby, since the temperature of the semiconductor laser 61 can be controlled to a still lower level, the life deterioration or the operation error of the semiconductor laser 61 can be prevented so that the reliability of the optical head 6 and the optical disc drive 1 using the same can be improved.

The laser driver IC 62 described in the present invention is arranged between the cantilever beam supporting members 642 in the fixed part. Then, with reference to FIGS. 2 to 5, details of the positional relationship between the laser driver IC 62 and the fixed part and the structures will be explained hereafter.

Figure 2:
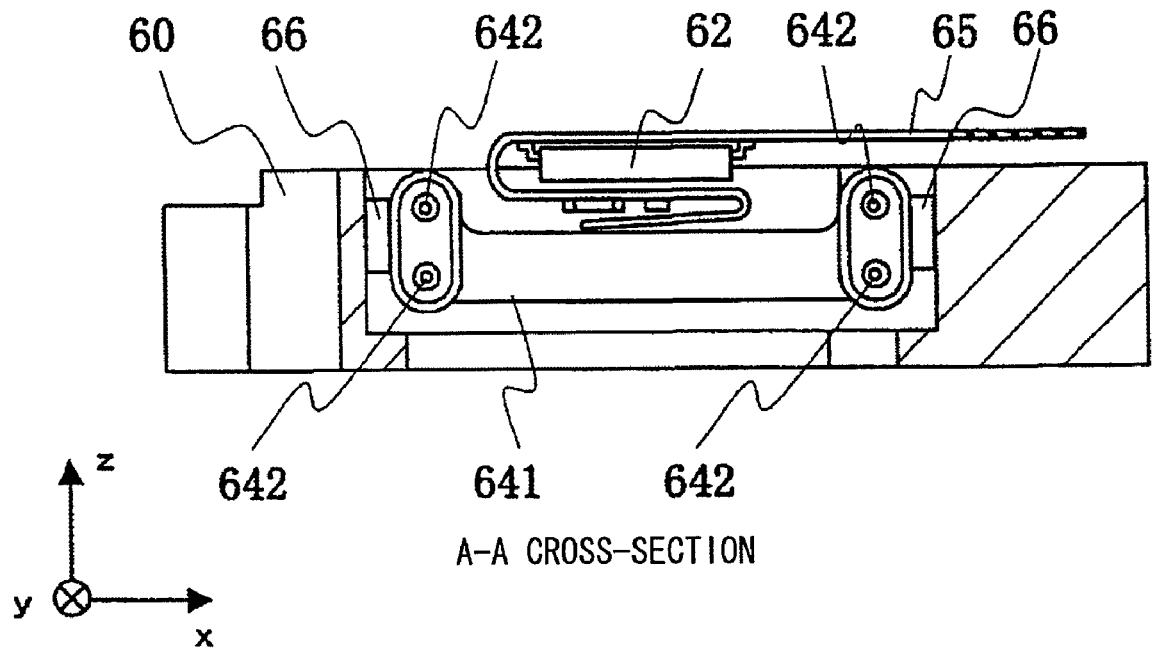
FIG. 2 is a cross-sectional view taken on the line A-A of FIG. 1, showing the arrangement of a laser driver IC in the optical head according to the present invention.
Figure 2:
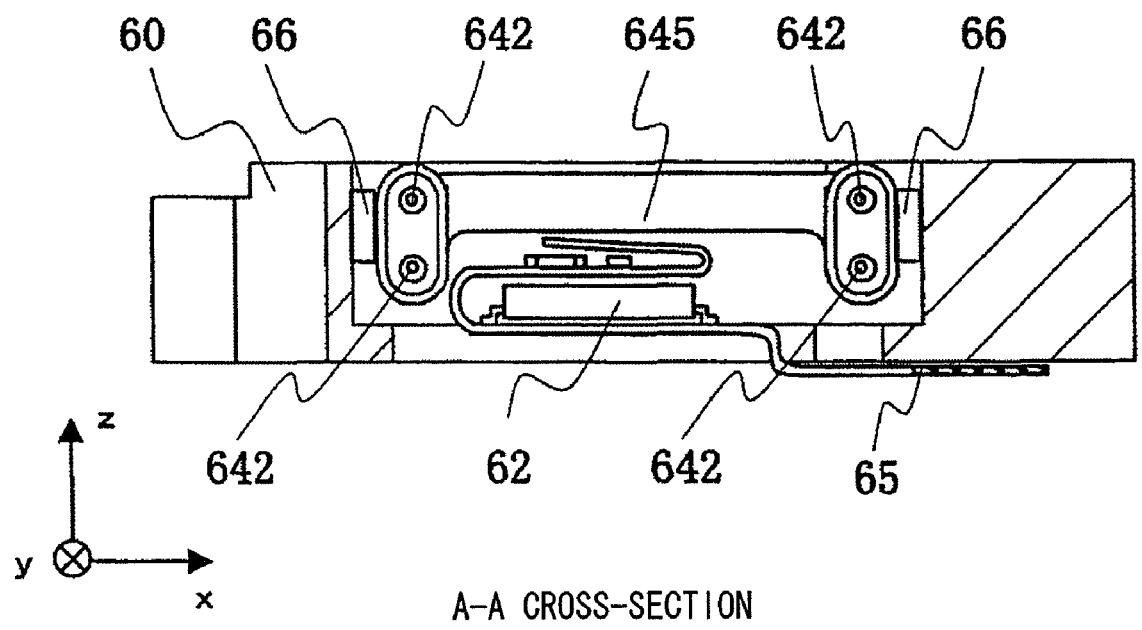
Figure 3:
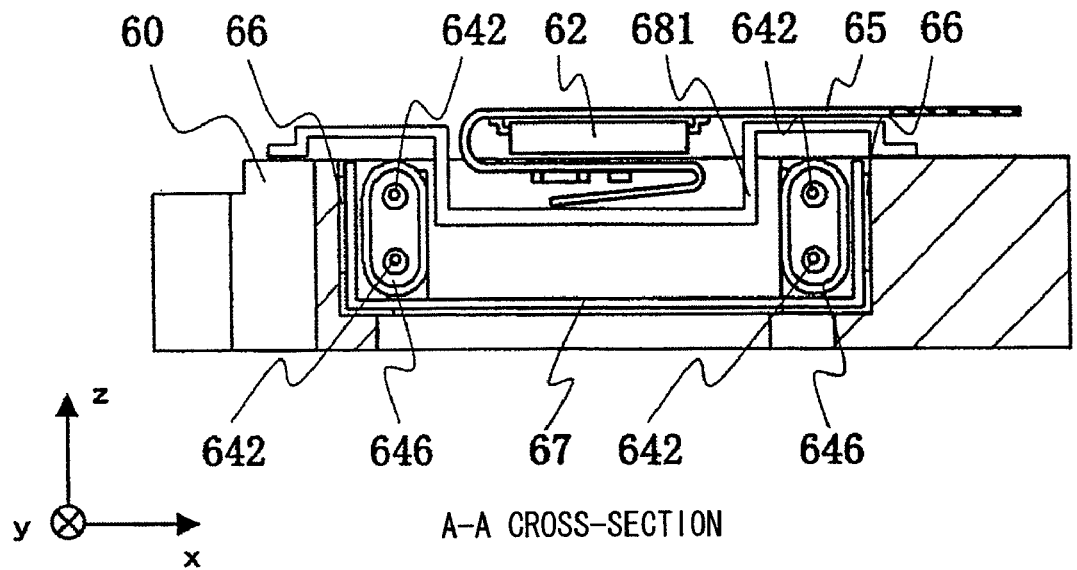
FIG. 3 is a cross-sectional view taken on the line A-A of FIG. 1, showing the arrangement of a laser driver IC in the optical head according to the present invention.
Figure 3:
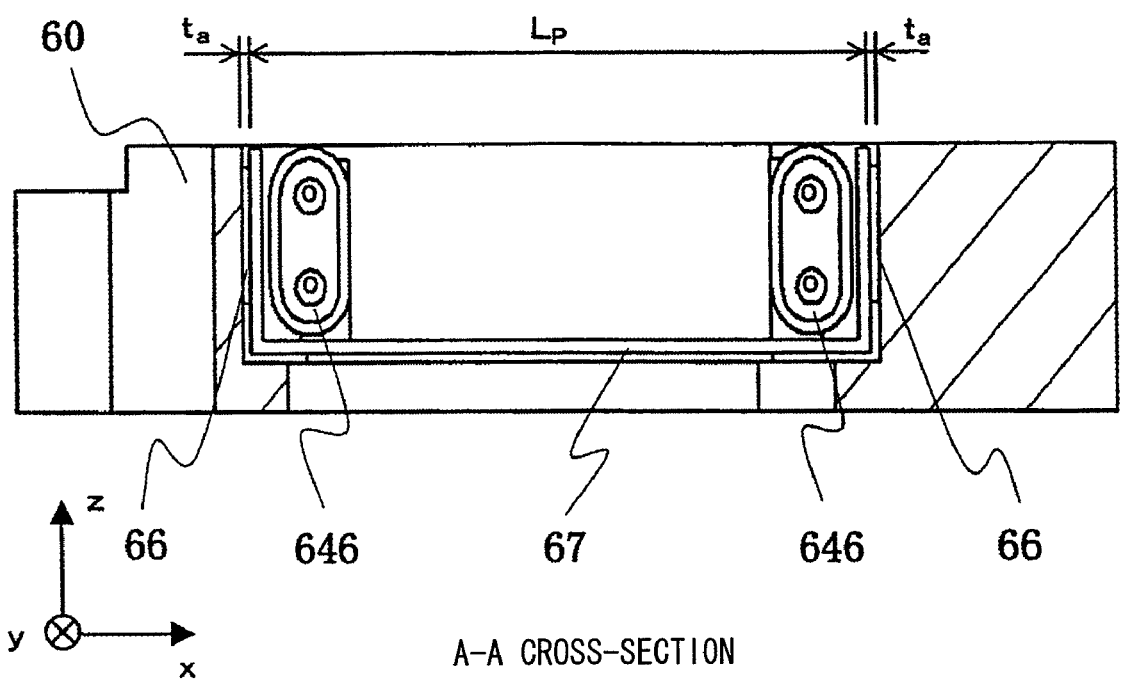

FIG. 2 is a cross-sectional view taken on the line A-A of FIG. 1 of the position with the laser driver IC 62 arranged. FIG. 2A shows an example of the case of arranging the laser driver IC 62 between the supporting members 642 in the fixed part 641 and above the fixed part 641, and FIG. 2B shows an example of the case of arranging the laser driver IC 62 between the supporting members 642 in the fixed part 645 and below the fixed part 645, respectively. In this embodiment, as shown in the figures, a space for arranging the laser driver IC 62 is ensured by providing the dent in the fixed parts 641, 645. Thereby, the open space is ensured around the laser driver IC 62 so that the heat transfer rate from the laser driver IC 62 to the housing 60 can further be reduced. Therefore, the temperature rise amount of the semiconductor laser 61 can further be reduced so that the temperature of the semiconductor laser 61 can be controlled to a low level. Furthermore, since the size of the optical head 6 needs not be enlarged in this case, the optical head 6 can be miniaturized, and thus it is advantageous.

On the other hand, in the case of arranging the laser driver IC 62 in the vicinity of the semiconductor laser 61 as in the conventional configuration, since the heat generated in the laser driver IC 62 is easily conducted to the housing 60 in the vicinity of the semiconductor laser 61, the temperature of the semiconductor laser 61 is inevitably raised. As a countermeasure therefor, a method of achieving the heat insulation between the semiconductor laser 61 and the laser driver IC 62 by providing a notch in the housing 60, or the like to reduce the cross-sectional area therebetween can be conceivable. However, in this case, the stiffness of the housing 60 is lowered. If the stiffness of the housing 60 is lowered, the optical parts fixed on the housing 60 can easily be displaced by an external disturbance so that the optical characteristics may be deteriorated.

As heretofore mentioned, according to the present invention, since the temperature of the semiconductor laser 61 can be controlled to a low level without leading to bulkiness of the optical head 6 or deterioration of the optical characteristics due to the decreased stiffness of the housing 60, the life deterioration or the operation error of the semiconductor laser 61 can be prevented so that the reliability of the optical head 6 can be improved.

Hereafter, with reference to the example with the laser driver IC 62 arranged above the fixed part 641 as shown in FIG. 2A, other embodiments will be explained. However, also in the case of arranging the laser driver IC 62 below the fixed part 645 as shown in FIG. 2B, the same effects can be achieved by switching the expressions of "above" and "below".

FIG. 3A is a cross-sectional view taken on the line A-A of FIG. 1 of the position with the laser driver IC 62 arranged. The fixed part 641 of the above-mentioned embodiment is formed integrally so as to link the fixed ends of the supporting members 642 by the same member at its both ends. On the other hand, in this embodiment, a first aspect is that the both ends of the metal member 67 are bent upward so as to surround the fixed part 646 in a U-shape, with the outer side surface of the bent part and the inner side surface of the housing 60 being connected and fixed by an adhesive 66. Furthermore, in this embodiment, a metal plate 681 is provided between the metal member 67 and the fixed part 646, and the laser driver IC 62. A second aspect is that the metal plate 681 is fixed to the housing 60 without contacting with the metal member 67 and the fixed part 646.

As the first aspect of this embodiment, the fixed part 646 is fixed to the housing 60 using the adhesive 66 via the metal member 67 with the both ends bent. Therefore, in the case the housing 60 is die-cast made of one of the above-mentioned alloys, since the coefficient of linear expansion $\alpha c$ is 20 to $30 \times 10^{-6}$ $K^{-1}$, by using as the metal member 67, a material having a coefficient of linear expansion smaller than that of the housing 60, such as an iron and a stainless steel, the thermal stress generated in the fixed part 646 can be alleviated even in the case the environmental temperature of the optical head 6 is changed, by setting the thickness ta of the adhesive 66 so as to satisfy the formula 1. That is, as shown in FIG. 3B, with the premise that the length of the metal member 67 is LP, the thickness of the adhesive 66 on one side ta, and the coefficients of linear expansion of the housing 60, the metal member 67 and the adhesive 66, $\alpha c$, $\alpha P$, $\alpha a$, respectively, since the distance between the both inner side walls of the housing 60 can be represented as the sum of Lc and LP, the thickness ta of the adhesive 66 can be calculated from the relationship of the formula 1.

(Formula 1)

$$(LP+ta) \times \alpha c = LP \times \alpha P + 2 \times ta \times \alpha a$$

Thereby, since generation of blurring of the focal spot by the optical aberration derived from the deformation of the fixed part 646 can further be restrained, writing and reading the information into or from the disc can be carried out accurately.

Moreover, since the metal plate 681 is provided between the fixed part 646, and the laser driver IC 62 and the flexible printed circuit 65 as in the second aspect, the fixed part 646 or the metal member 67 cannot be deformed by the contact of the laser driver IC 62 or the flexible printed circuit 65 with the fixed part 646 or the metal member 67. Therefore, since generation of blurring of the focal spot by the optical aberration derived from the deformation of the fixed part 646 can further be restrained, the reliability of writing and reading the information into or from the disc can be further be improved.

Figure 4:
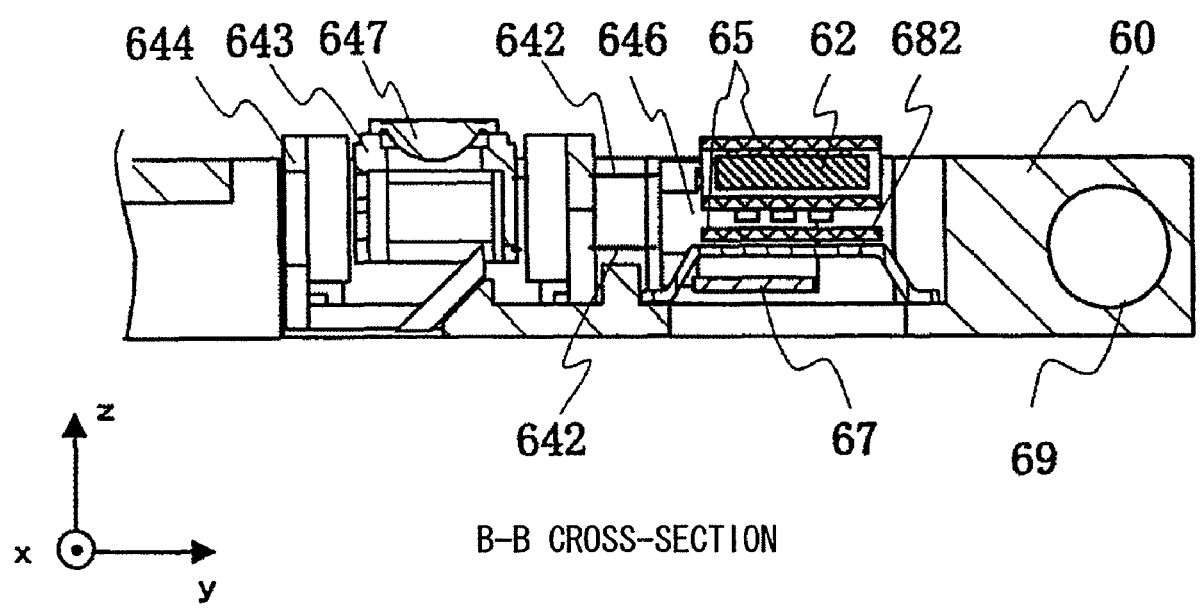
FIG. 4 is a cross-sectional view taken on the line B-B of FIG. 1, showing the arrangement of a laser driver IC in the optical head according to the present invention.

Next, with reference to FIG. 4, another embodiment will be explained. FIG. 4 is a cross-sectional view taken on the line B-B of FIG. 1 of the position with the laser driver IC 62 arranged. In this embodiment, the positioning and fixing position of the housing 60 with respect to the metal plate 682 is provided on an elongating portion below the fixed part 646 of the housing 60. Thereby, since the space above the fixed part 646, which has been required for providing the metal plate 682 above the fixed part 646 without contacting with the fixed part 646, can be omitted, the optical head 6 can be provided thinly, and thus it is advantageous. Thus, deformation of the fixed part 646 can be restrained without leading to enlargement of the size of the optical head 6. Therefore, since generation of blurring of the focal spot by the optical aberration derived from the deformation of the fixed part 646 can further be restrained, writing and reading the information into or from the disc can be carried out accurately.

As heretofore mentioned, according to the present invention, since the temperature of the semiconductor laser 61 can be controlled to a low level without leading to the size change of the optical head 6 or deterioration of the optical characteristics due to the deformation of the fixed part, the life deterioration or the operation error of the semiconductor laser 61 can be prevented so that the reliability of the optical head 6 and the optical disc drive 1 using the same can be improved. The present invention can be utilized for an optical disc drive.

What is claimed is:

1. An optical head comprising a semiconductor laser for emitting a laser beam to read or write the information from or into a disc, a laser driver IC for driving the semiconductor laser, a photo detector for converting a reflected light beam from the disc into an electric signal, an object lens actuator for guiding the laser beam to a predetermined position on the disc, and a plurality of bearings for movement in the radial direction of the disc, wherein the semiconductor laser and the photo detector are arranged on one side with respect to a straight line through the center of the object lens of the object lens actuator and in parallel to the axis contacted with the bearings, and the laser driver IC is arranged on the other side with respect to the straight line, and wherein the object lens actuator comprises an object lens for focusing the laser beam on the recording surface of the disc, a holding means for holding the object lens, cantilever beams with their own open ends connected with the holding means, and a fixed part connected with the fixed ends of the cantilever beams, the laser driver IC being arranged between the cantilever beams in the fixed part.

2. The optical head according to claim 1, wherein the fixed part has a dent for arranging the laser driver IC.

3. An optical disc driver comprising the optical head according to claim 1, and a metal cover provided between the optical head and a disc, wherein the metal cover has an opening part between the disc and the object lens, and between the disc and the laser driver IC.

4. An optical head comprising a semiconductor laser for emitting a laser beam to read or write the information from or into a disc, a laser driver IC for driving the semiconductor laser, a photo detector for converting a reflected light beam from the disc into an electric signal, an object lens actuator for guiding the laser beam to a predetermined position on the disc, and a plurality of bearings for movement in the radial direction of the disc, wherein the semiconductor laser and the photo detector are arranged on one side with respect to a straight line through the center of the object lens of the object lens actuator and in parallel to the axis contacted with the bearings, and the laser driver IC is arranged on the other side with respect to the straight line, and a metal cover provided between the optical head and a disc, wherein the metal cover has an opening part between the disc and the object lens, and between the disc and the laser driver IC, and wherein the both ends of a metal member are bent in a U-shape so as to surround the fixed part for bonding and fixing the bent portions of the metal member and the side walls of the housing of the optical head facing the bent portions.

5. The optical disc drive according to claim 4, wherein a metal plate is provided between the metal member and the fixed part, and the laser drive IC such that the metal plate is contacted and fixed to the housing of the optical head without contacting with the metal member and the fixed part.

* * * * *